(12) United States Patent
Shteyn et al.

(10) Patent No.: US 6,782,253 B1
(45) Date of Patent: Aug. 24, 2004

(54) MOBILE MICRO PORTAL

(75) Inventors: Yevgeniy Eugene Shteyn, Cupertino, CA (US); Paul John Rankin, Horley (GB); Simon Royce Turner, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 13 days.

(21) Appl. No.: 09/635,548

(22) Filed: Aug. 10, 2000

(51) Int. Cl.[7] .............................................. H04M 11/10
(52) U.S. Cl. .............................. 455/414.1; 455/414.2; 455/456.3; 455/456.5; 455/456.6
(58) Field of Search ...................... 455/558, 41, 456.1, 455/414, 458, 550, 456.3, 456.5, 414.1, 414.2

(56) References Cited

U.S. PATENT DOCUMENTS

| | | | |
|---|---|---|---|
| 5,243,415 A | * | 9/1993 | Vance .......................... 358/86 |
| 5,420,860 A | * | 5/1995 | Stevens et al. .............. 370/263 |
| 5,539,395 A | * | 7/1996 | Buss et al. ................... 340/827 |
| 5,835,861 A | | 11/1998 | Whiteside ..................... 455/456 |
| 5,983,199 A | | 11/1999 | Kaneko ........................ 705/26 |
| 6,088,598 A | * | 7/2000 | Marsolais ..................... 455/566 |
| 6,246,376 B1 | * | 6/2001 | Bork et al. ................... 343/760 |
| 6,278,877 B1 | * | 8/2001 | Brederveld et al. ........... 455/434 |
| 6,327,300 B1 | * | 12/2001 | Souissi et al. ............... 375/219 |
| 6,351,640 B1 | * | 2/2002 | DeMont ...................... 455/426 |
| 6,456,852 B2 | * | 9/2002 | Bar et al. ................. 455/456.1 |
| 6,603,969 B1 | * | 8/2003 | Vuoristo et al. ............. 455/433 |

FOREIGN PATENT DOCUMENTS

| | | |
|---|---|---|
| WO | WO 98/18094 | 10/1996 |
| WO | 00/04476 | 1/2000 |
| WO | WO 00/22860 | 4/2000 |

OTHER PUBLICATIONS

"People, Places, Things: Web Presence for the Real World", T. Kindberg et al, pp. 1–16.
"Wherehoo: The Stuff Around You", 1 page.
"Location Awareness in HP's Cooltown", V. Krishnan, pp. 1–3.
"Streetwise" Location–Based Agent Assistance, J. Youll et al, pp. 1–3.

* cited by examiner

Primary Examiner—William Trost
Assistant Examiner—Danh Le
(74) Attorney, Agent, or Firm—Kevw Simons

(57) ABSTRACT

A geographic region has a network of beacons. Each beacon transmits a short-range facilitation signal for receipt on a user's mobile communication device. The facilitation signal initiates associating the facilitation signal with a service and conditionally alerts the user to the service via the device dependent on a user profile. The user-profile and the association between facilitation signal and service are user-programmable.

7 Claims, 4 Drawing Sheets

MOBILE MICRO PORTAL

FIELD OF THE INVENTION

The invention relates to services offered to users of electronic equipment, especially to services for users of mobile devices such as mobile phones.

BACKGROUND ART

Current trends indicate that by 2002 there will be 1B subscribers worldwide to mobile phones. By 2004 there will be more mobile phones in use than PC's, and a substantial percentage of these phones will be Web-enabled. Further, cellular phones have become personal, trusted devices. As a result a mobile information society is developing. Personalized and localized services are believed to become increasingly more important.

For example, U.S. Pat. No. 5,835,861, herein incorporated by reference, discloses the use of wireless telephones within the context of advertisement billboards. The user of a wireless telephone obtains the telephone number of a vendor by activating his/her wireless telephone to transmit a prompt signal to an active advertisement source and to receive from the advertisement source a response signal containing the telephone number of the advertising vendor. The telephone number can then be used to automatically place a call to that vendor via the public switch telephone network. Alternatively, the telephone number can be stored for use later on. This arrangement can be used to place a call to a vendor without having to either memorize the telephone number or to write it down. The signals between the billboard and the caller can be transmitted as modulated infrared (IR) or radio frequency (RF) signals.

As another example, the publication "Impulse: Location-based Agent Assistance", Jim Youll, Joan Morris, Raffi Krikorian and Pattie Maes, MIT Media Lab, December 1999, discusses a research project on location-based computing supported by software agents. The user has a mobile computing appliance, e.g., a PDA with wireless Internet connection and a GPS receiver. A "User Agent" represents user's interest and interacts with "Provider Agents" that represent Providers: physical resources such as businesses, services, attractions, events, in the user's physical domain. The resources have an Internet presence (URL's) and have registered with a specific server. The specific server allows a User Agent to query for particular resources in the geographic vicinity of the user. The User Agent receives its tasks from the user in the form of a list of goals represented by key words entered in advance by the user into the appliance. The User Agent uses these data to build a user profile and to build queries for the server and the Provider Agents. The server uses the geographic location of the user, as determined through the GPS receiver, as its primary criterion in the queries. Upon finding results, the server returns an XML document including geographic location of each Provider's service and a description of how to query each Provider Agent. After determining the reachable Providers, the User Agent selects the relevant one(s) and sends a direct query to it or them. The latter is achieved through reading the documents at the URL's provided. Upon this analysis the user gets notified of potential matches.

As yet another example, Hewlett-Packard has posted a publication on the Web at <http://www.cooltown.hp.com/papers/webpres/WebPresence.htm> about their "Cooltown" project. The convergence of Web technology, wireless networks and portable client devices provides design opportunities for computer/communications systems. In the HP Labs "Cooltown" project these opportunities have been explored through an infrastructure to support web presence for people, places and objects. Web servers have been put into objects such as printers and information has been stored on the web servers about objects such as artwork. Physically related objects are grouped into places embodied in web servers. Systems that are location-aware can be created using URL's for addressing, physical URL beaconing and sensing of URL's for discovery, and localized web servers for directories. The systems are ubiquitous to support nomadic users. On top of this infrastructure the Internet connectivity can be leveraged to support communications services. Web presence bridges the World Wide Web and the physical world inhabited by the users, providing a model for supporting nomadic users without a central control point.

The Cooltown Museum and Bookstore offer visitors a Web-enhanced experience. As visitors tour the museum, their portable digital assistant (PDA) can receive Web URLs from wireless "beacons". These beacons are small infrared transceivers located close to pictures or sculptures; the URLs link into a Web of information about the items. Using the PDA's Web browser, visitors can read or hear about the artist or the work and about related art works in the museum. The URLs can also be stored as bookmarks for further study or they can be used to select reproductions of the artwork from the museum's online store. The museum staff uses the same URLs for inventory control as the URLs point to the object's point of Web presence.

SUMMARY OF THE INVENTION

The inventors have realized that the systems discussed above have some drawbacks.

The system of U.S. Pat. No. 5,835,861 mentioned above lacks some flexibility and user-friendliness. The user him- or herself has to initiate the interaction between the billboard. Also, the functionality of the system is restricted to a one-to-one relationship between the billboard, its geographic location and the vendor's telephone number broadcasted. That is, the information obtained by the end-user is only a specific telephone number. It is unclear from U.S. Pat. No. 5,835,861 how the end-user distinguishes between multiple telephone numbers thus gathered from as many billboards. The user's caller-ID can be received and processed by the billboard, thus possibly compromising privacy. Note that the communication is independent of the orientation of the user with respect to the billboard, which precludes having two or more billboards within a certain range.

The Impulse system requires a GPS functionality for determining the user's location. Internet access capabilities are required for communication between the software agents in the client-server architecture. In the Impulse system, user agents are all user initiated. The user has little, if any, control over the provider agents and the negotiation process between provider agents and user agents. The use of provider agents implies a lack of privacy for the user.

The Cooltown system requires a full web browser and display capability to allow navigation within the Web page indicated by the URL broadcasted. In addition, the user gets exposed to URL's without knowing in advance whether or not the content information of the associated Web page is relevant to the user. Also, the user has to keep his/her client device always on for being able to browse the Web pages while on the move.

Accordingly, it is an object of the invention to provide a method and system that are more user-friendly, provide more privacy or are more flexible than the systems discussed above.

To this end, the invention provides a method of enabling a user of a mobile communication device to receive a short-range wireless facilitation signal on the device. A beacon transmits the facilitating signal. When the user's device is within range of the beacon the facilitation signal initiates associating the facilitating signal with a service. The initiating leads conditionally to alerting the user to the service, depending on a user-profile, preferably stored at the mobile device. Accordingly, the user is enabled to get only information about services that are of interest to him/her as indicated by the user-profile. If the service associated with the facilitation signal matches the user-profile, the user gets alerted to the service via the device, e.g., via a text message generated on a display of the communication device. If the service does not match the profile, the device does not alert the user.

The alerting text message can be generated in a way similar to paging or SMS (Short Message Service). SMS uses GSM communication and allows sending of text messages of up to 160 characters to mobile phones. Preferably, the user can program the device so that he/she is to be alerted through an audible signal if the service matches the user's profile. This way, the user does not have to keep an eye on the mobile communication device all the time. Preferably, the device can store the facilitation signals and/or the messages thus received for retrieval later on. Other mechanisms to alert the user can be used, e.g., a visual warning on the mobile communication device or a tactile warning through a vibration unit in the communication device as known from pagers, etc. Accordingly, alerts can be tactile (vibration), text, visual or audible. Different modalities, e.g., amplitudes or styles, can be used for different priorities within the current user's context. The context (filter) selection by the user may well control the modality of any alerts as well as what opportunities are alerted.

Emerging wireless PAN/LAN network protocols, such as IrDA, Bluetooth and HomeRF, enable mobile devices to become a dynamic part of a home-, office- or community network. Especially a mobile phone equipped with, e.g., Bluetooth-compatible hardware and software, can communicate directly with a local device and/or local service. In general, each network component can be a service-offer-point (SOP). The network comprises, for example, a home network, an office network, or an infrastructure of components in a public place such as a shopping mall, a street, an airport, a local town network or community network, etc. Each component has a beacon that transmits or broadcasts a facilitation signal associated with meta-data relating to information content or services provided at, or represented by, the component or associated with the network. The beacon's range is typically short-range as with Bluetooth.

Preferably, the user-profile is user-programmable. For example, the user is enabled to set his/her communication device into one (or more) of multiple activity modes, e.g., shopping, contacting, chatting, messaging with friends, special interests such as sports, communal activities, etc. The user may have multiple profiles that he/she can select depending on the context or environment. The user can specify the shopping mode as having a particular interest in, e.g., books, CD's, DVD's travel arrangements, tools, etc., according to a topic or interested if on sale with a discount, etc. Facilitation signals that are associated with this shopping activity then cause the user to be alerted of certain nearby services or goods. The contacting mode relies on messages posted by other people and carried, or referred to, by the facilitation signal. If the message or sender group fits the current user-profile, i.e., does not get filtered out, the user gets alerted to the message. The message posted is, e.g., a virtual advertisement by a private person relating to goods the person wants to sell or buy, or in the chatting mode a virtual announcement for meeting another person. The message posted in this manner can be referred to as "Virtual Graffiti", and includes text and/or voice. In a special interest mode, the user allows the mobile communication device to become susceptible to services that relate to special interests. For example, a historically, geologically, architecturally, fashionably etc., interesting district of a certain region has a network of beacons that broadcast facilitation signals relating to relevant sites and their background information. The facilitation signals labeled "historic", "architectural", "fashionable", etc., cause the user to be alerted of a relevant site or associated local service, while roaming within range of the relevant beacon, if the user has programmed his/her profile accordingly.

The user may consciously select a context filter from his/her set. The selection may also be done through a default process, e.g., a tagged pouch that contains the phone sets its default context, or the user may allow the environment to automatically trigger the selection of one of the user's filters, e.g., as he/she walks into a place.

Preferably, the association between the facilitation signal and the service is user-programmable. That is, the user is allowed to program an association between a certain type of facilitation signal with a certain service provider of his/her own choice, hence the title of this invention: "Portable Micro Portal". The invention thus enables the user of a mobile device to leverage personalized relationships with external servers while communicating with local or personal-area SOPs. The mobile device receives information from an SOP, determines at least one action type associated with this information, performs a type-based lookup of a personal relationship with a service provider, and accesses an external server or a wide area network telephone number, associated with the action type and the service provider.

The invention maintains privacy and user control, but still facilitates a push technology. That is, the user remains anonymous to the system, receives all possible alerts, and has a context filter in his/her own portal to let through matches or has the matches recorded for future examination. Possibly, the micro portal could adapt and learn from the user's acceptance and ignorance of alerts within different contexts so as to improve the context filters.

BRIEF DESCRIPTION OF THE DRAWING

The invention is explained in further detail, by way of example and with reference to the accompanying drawing, wherein.

Throughout the drawing, same reference numerals indicate similar or corresponding features.

DETAILED EMBODIMENTS

Figure 1:
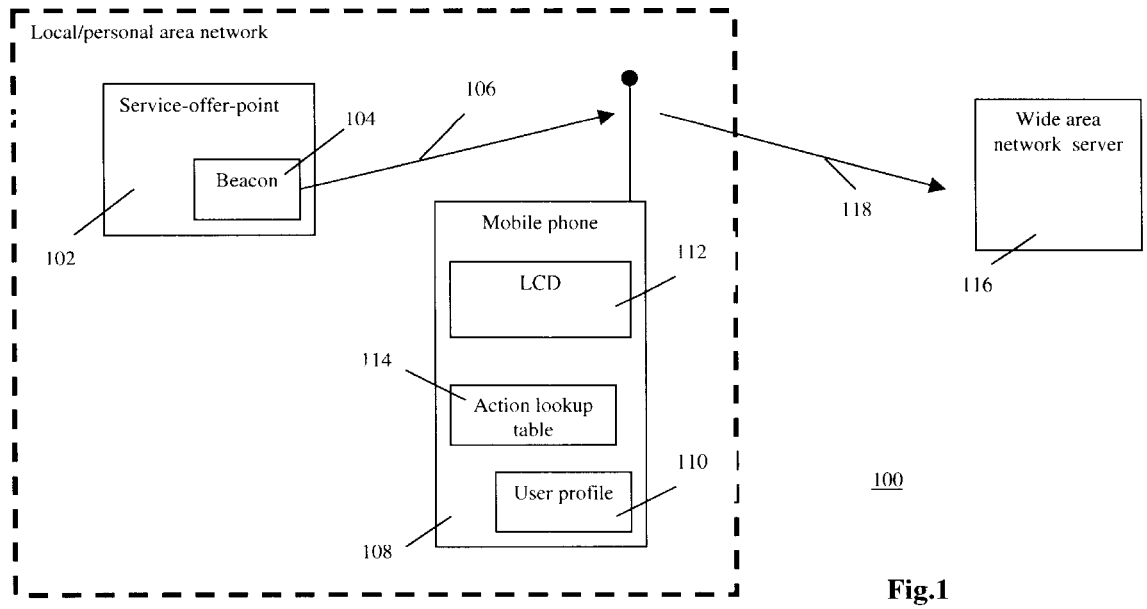
FIG. 1 is a block diagram of a system of the invention.

The invention relates to the use of a personal, trusted mobile communication device, such as a mobile phone, to interact with service-offering points (SOPs) as mentioned above. Several aspects deserve to be considered in view of the potential number of SOPs and the variety of information items they can supply to a mobile user. A first aspect relates to the limited user interface (UI) capabilities of portable devices. For example, the size of the LCD of a mobile phone is often not large enough to display a significant amount of textual or graphical information. User input is often limited to a numeric (virtual) keypad and/or a speech recognition capability of the device. Another aspect is associated with the technical limitations, such as low bandwidth of the wireless channel and power conservation requirements. Wireless transmission data has to be compressed. This typically requires additional processing capabilities on the mobile device or multiple information exchanges with a third party server to facilitate the compression and decompression processes. Yet another aspect relates to a potential loss of privacy. For example, the user may become bombarded by a large number of unsolicited commercial messages, thus creating a noisy informational environment. When communicating with the SOP, the user's personal information, such as credit card number, buying habits, personal preferences, etc., may become exposed.

Considering these and other perspectives, it is an object of the invention to enable to provide a wide variety of personal services for mobile users that add value to the personal trusted mobile device such as a cell phone. The invention enables a user of a mobile device to leverage personalized relations with external servers while communicating with local or personal area SOPs. The mobile device receives information in the form of a facilitation signal from a SOP, determines at least one action type associated with this information, performs a type-based lookup of a personal relation, and accesses an external server, associated with the action type.

For example, a DVD player in the home network plays out a specific movie from a DVD. The DVD player has a beacon that sends a facilitation signal that is associated with information about the movie, the movie stars, movies of the same or similar category, related merchandise (books, T-shirts, movies, etc.). The facilitation signal is coded, e.g., onto the DVD itself. The user receives this facilitation signal on his/her Bluetooth-equipped cell phone, e.g., as a simple paging or SMS text file. He/she may then choose to request additional information via the cell phone, buy some of the offerings via the cell phone, chat to friends about the content via the cell phone, etc.

In another example, a TV set or a set-top box is provided with a beacon for short-range signals. A TV broadcast is accompanied by, or controls the generation of, a facilitation signal containing meta-data that enables to alert the user, via the user's mobile device, of the possibility to obtain a book or CD relevant to the program currently broadcast. The user may want to have control, for example, of the resolution of the link from their purchase consent, for an item associated with the current TV program content, to his/her own preferred vendor service.

As another example, a content play-out or storage device, such as TV, a Tivo HDD box, a set top box, PC, etc., communicates with the user's mobile communication device via a short range beacon. The communication signal contains meta-data, which relates to a popular television quiz show. The meta-data enables the user to receive the quiz questions, part of it or a derivative of it, and/or multiple choice response options. When the device is set to the "Search" mode, it uses the quiz question information, as a query for a search over preferred informational sources, e.g., www.askj.com. When in the "Play" mode, the device enables the user to enter his/her contribution in the same manner as a live audience participant, player, adviser, etc. Accordingly, the combination of the play-out device with the beacon, facilitation signal and mobile device allows a user to participate in a quiz broadcast using his/her preferred informational sources, In another example, a content sharing system, such as Napster (www.napster.com), is enabled to communicate with the micro portal via a wireless beacon. The user, for example, can configure the system to notify her when another user is downloading a certain content item from her local system. The beacon then can send information related to the uploaded content and the other user. When put into the "Chat" mode, the micro portal enables the first user to start voice and/or electronic chat to discuss content related topics.

In yet another example, a retail store, supermarket, downtown shopping street or shopping mall has a network of beacons. Each specific one of the beacons is associated with a certain geographic location and transmits a facilitation signal with information on, e.g., items currently on sale that can be of interest to the user. Based on that information, the user may choose to stop by a certain shop to try on a piece of clothing, order a book, listen to a CD, etc. A similar functionality can be accomplished by using short-range communications-enabled PDA's.

In a certain mood, the user may wish to activate or select a specific context filter on his/her phone, which just alerts the user to connection opportunities for shopping rather than for services which offer more information or chatting. The current invention is concerned the processes of micro portal negotiation using context filters and service resolution using look-up tables. Both processes are possibly distributed across the handset and the user's own or trusted intermediary web site.

FIG. 1 is a block diagram of a system 100 illustrating one aspect of the invention. System 100 comprises a service-offer-point (SOP) 102 with a beacon 104 that transmits a facilitation signal 106 received by a mobile device 108. Device 108 stores, in this example, a user profile 110 that indicates the current interests or activity mode entered by the user through a suitable user-interface. Signal 106 is interpreted by device 106 and it is checked against profile 110. If signal 106 represents a service currently of interest to the user as indicated by profile 110 the user is alerted to this service via a text message generated on display 112. Device 108 comprises an action look-up table 114 at least partly programmed by, or under control of, the user. The action associated with the current service is to be initiated by the user via device 108 and includes accessing an external server 116 associated with the action type and chosen in advance by the user for being programmed into lookup table 114. Accessing sever 116 comprises sending a service request 118. Note that SOP 102 and server 116 are never directly connected in this example, thus preserving privacy and full user-control of the follow up on an alert.

To illustrate the above in more detail, consider the example wherein a user is watching a movie played out by a DVD player 102. The DVD player sends out a facilitation signal 106 with information, e.g. in XML format, about the book, which was used for the screenplay. The book information is processed by the user's mobile device 108. The relevance of the facilitation signal is determined by profile 110 and, if found relevant, the action type is determined to be "buy a book", e.g., through table 110. The user has set up an account with a specific external book selling Internet service 116. The account information is already stored in mobile device 108 and is associated with the "buy a book" action type. Mobile device 108 uses a pre-defined URL to access web merchant 116 and to request an availability search for the book. When the search is complete, its results are provided to the user's mobile device 108 in order to receive a purchase approval. The user may choose to buy the book, or ignore the information. As shown in the example, the user has full control over the information flow. Also note that for mobile phones a billing system is already in place so that the charge for the service offered can be merged with the telephone bill.

Figure 2:
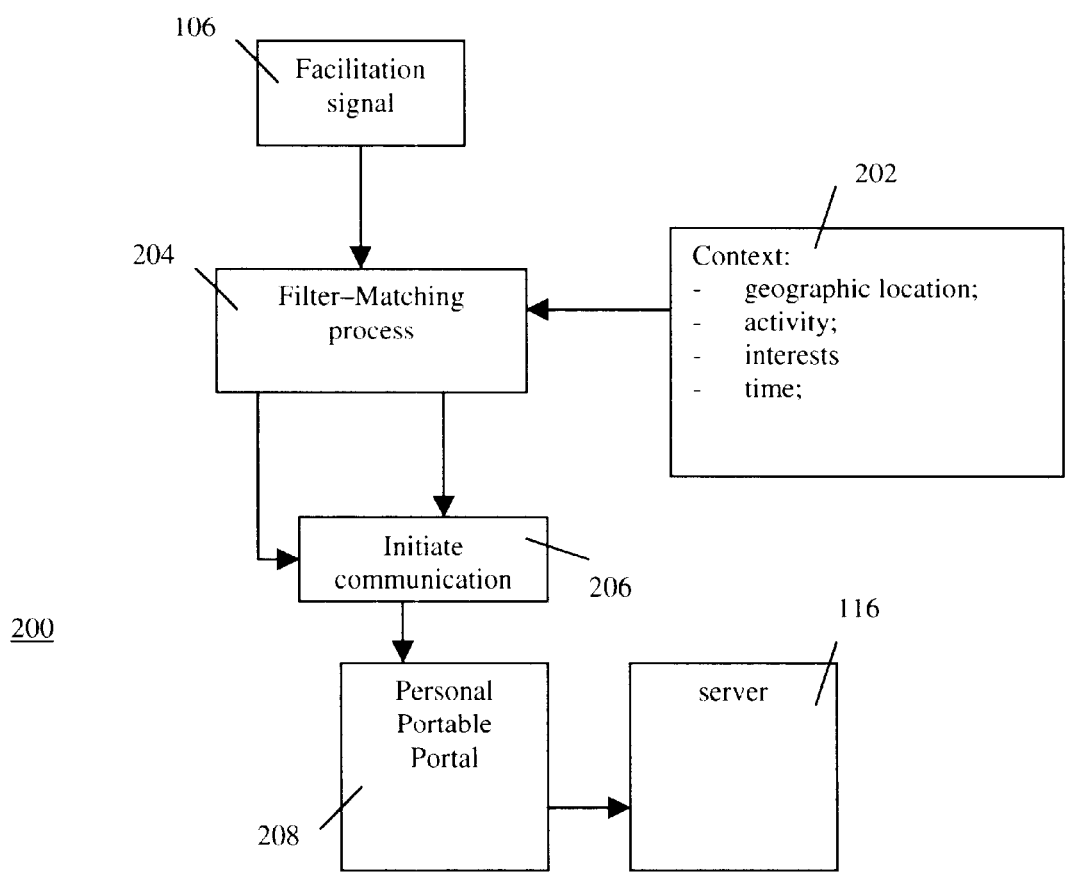
FIG. 2 is a diagram with operational aspects of the system.

FIG. 2 is a diagram illustrating operational aspects of the invention. Facilitation signal 106 is received by device 108 where it is mapped onto a context 202 in a filter/matching process 204. Context 202 depends on, e.g., the geographic location, the user's activity (e.g., work, shopping, at home, out with friends, business trip, the user's interests (e.g., natural history, motorcycles, sailing, beer, the time of the day, etc. Context 202 comprises in this example one or more user-profiles 110 as a sub-set of subjective, user-programmable criteria. The context may correspond to a user's goal or intent, as well as an activity or location. The quantity "time" is an objective concept. Context switching can be explicit in response to a user-interaction, e.g., disconnecting device 108 from a cradle or phone jacket, or can be implicit as given by a timer, scheduler or calendar. Communication with an external service provider is conditionally enabled in process 206 depending on the outcome of matching process 204. If there is a match, the relevant external service provider is determined in look-up table 114 in a personal portal 208 to the Internet or other data network.

The user may have a number of profiles, set up for different contexts. The user may explicitly select a profile to be used in process 204, e.g., 'shopping', or have one of his/her profiles optionally triggered by a signal from the environment or time of day (e.g., through a functional connection to calendar). Moreover, the environment (or network cell) might, for consenting users, download to the mobile phone a top-level structure (or guide) for the classes of possible signals on the beacons available in the geographic area. For example, on entering a shopping mall the user causes such a guide to be downloaded. The guide contains indications of beacon-associated services for a variety of cafes, shops, amusements, utility services, etc. This download will aid the structuring of the negotiation and of the alerts with which the user's mobile device can interact. At download time, some user pre-filtering of the classes of services embraced might also be done, e.g., to only sense certain beacons in the area and ignore others bearing unwanted service classes. A hierarchic beacon organization can be set up for the geographic location. This may lead to more complex arrangements of the beacon infrastructure.

Note that filter matching process 204 and portal action— table 208/114 can be carried out on device 108, here by way of example a mobile phone, in its entirety. Alternatively, these processes can be performed on a remote, trusted server, or in a distributed fashion, with top-level details of a match done quickly at the hand-set and the finer details of serving alerts via a server.

Figure 3:
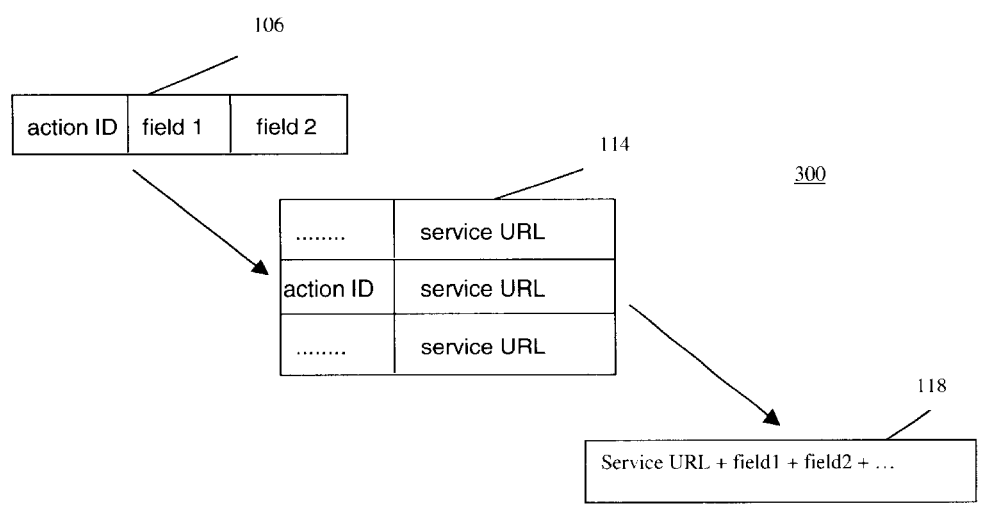
FIG. 3 is a diagram with various stages in the processing of data.

FIG. 3 is a diagram 300 illustrating a first example of a data format for support of the routing of information in system 100. The action type determination can be done by, for example, a direct lookup. In this case facilitation signal 106 comprises data formatted in such a manner that each action type has a pre-defined value associated with it, e.g., an alphanumeric ID. Mobile device 108 uses the ID to locate an entry in its service lookup table 110. Information field values represent, for example, a name of a publisher, a title of the book, author names, or ISBN number, etc. Combining the results of the look-up with the information field values forms the service request. The look-up service may also contain the rules for combining the information fields. For example, <www.amazon.com/exec/obidos/Author=Bettelheim%2C%20/Bruno>, where the service URL is <www.amazon.com/exec/obidos/> and field1 and field2 are composed of the authors name.

Figure 4:
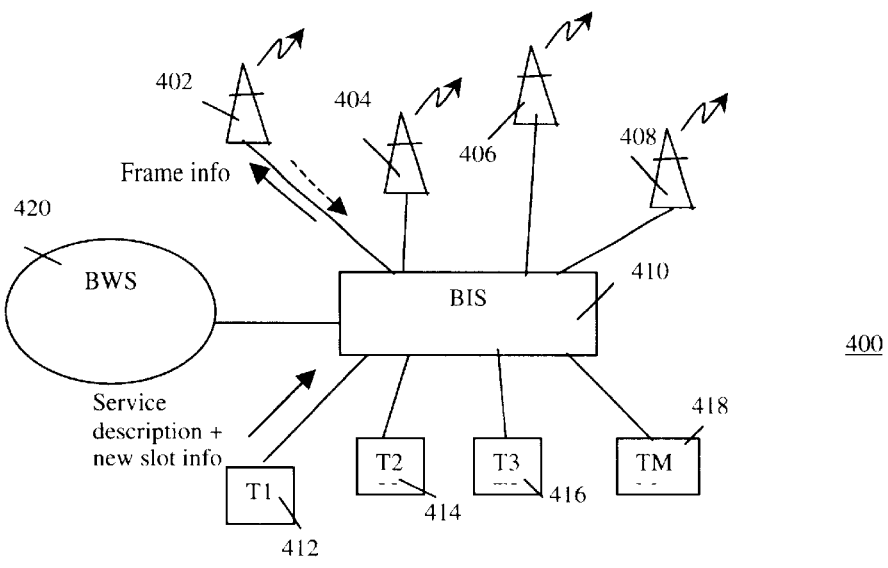
FIG. 4 is a diagram of a system with a plurality of beacons.

FIG. 4 is a diagram of a system 400 in the invention. System 400 illustrates an implementation of an infrastructure for, e.g., shops, a shopping mall, a theme park, etc. System 400 comprises a plurality of beacons 402, 404, 406, . . . , 408 distributed over a series of locales. Each of beacons 402–408 broadcasts one or more short-range facilitation signals in a time-slot format as explained below. Beacons 402–408 controlled by a beacon infrastructure server (BIS) 410. One or more terminals 412, 414, 416, . . . , 418 are connected to server 410. Terminals 412–418 enable service providers, i.e., the users of beacons 402–408, to author or edit allocated service slots in the facilitation signals transmitted by beacons 402–408. A service provider may lease a beacon or one of the beacon's service slots from the infrastructure provider. To this end, server 410 provides simple HTML templates for being filled out by, e.g., a service provider author, via one of terminals 412–418. Upon having filled out the template with, e.g., a description of the service and other information for the data exposed in the service slot, the template is returned to server 410, preferably via a secure link using, e.g., Secure HTTP (S-HTTP) or Secure Sockets Layer (SSL). SSL creates a secure link between a client and a server, over which any amount of data can be sent securely. S-HTTP is designed to transmit individual messages securely. Server 410 then creates the appropriate service slot for the facilitation signal of a relevant one of the beacons 402–408 based on the information submitted with the template. System 400 may further comprise an application server 420 to assist in carrying out matching process 204 as is explained below.

Figure 5:
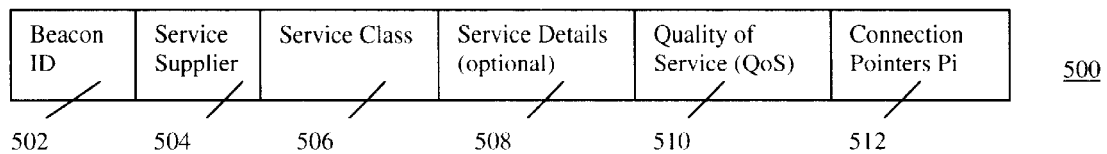
FIG. 5 is a diagram illustrating a time slot in the facilitation signal.

FIG. 5 gives an example of a service slot 500 having time slots 502, 504, 506 508, 510 and 512. Slot 502 comprises the beacon's ID. Slot 504 comprises the name or an identifier of the service provider. Slot 506 has an indication or representation of a class of services provided, e.g., books, travel, stocks, music, entertainment, etc. Slot 508 comprises as an option further details about the service. Slot 510 comprises data representative of the quality of service (QoS) provided. Slot 512 has a connection pointer for accessing the service supplier. The connection pointers may be prefixed by a pointer type (e.g., SMS, toll telephone -#, URL). One service may have alternative pointers for the mobile to activate the service connection. Various qualities of service may be supported by the same service provider, e.g. SMS, Audio interaction, GPRS, WAP etc. These should also be matched against the user's preferences, mobile platform options, and cost preferences.

A negotiation process may take place for finding a match between profile and appropriateness of a service class before the service activation with a selected quality of service, QoS. The chosen QoS should fit the user's context, and the charging rate should be acceptable to the user. Therefore, different QoS have different priorities at different times of the user's day. Before using pointer 512 to activate the service connection (which may be made over GSM cellnet, SMS, or even over an RF/IR link, Bluetooth) the class 506

(and possibly further details, e.g., QoS) is compared with a current subset of the user profile. The subset may be stored on device 108 (e.g., as a table), or remotely on a web site owned by the user (or provided by the beacon infrastructure provider for end users). The first stages of correlating class 506 and further service details 508 against the subset are preferably automatic. These may happen even before the user is notified by mobile device 108 of the presence of a link to that service. For example, if a service of the class specified by 506 matches a table of classes held on device 108, the user is alerted and may activate service pointer 512 with a single key press on device 108. Alternatively, device 108 first automatically issues (e.g., via SMS) a request to remote application server 420 for a more exact correlation between the service's details and the subset. If the service is deemed to match the user's current interest and intent, a positive answer is returned to device 108 and only then is the user alerted by device 108 of the service's presence. The user then has the choice to activate the service automatically via its pointer 512. A beacon may transmit a frame comprising a plurality of service slots, such as service slot 500. The frame thus offers a plurality of connection bridges to various local services subscribed to beacon infrastructure server 410.

Figure 6:
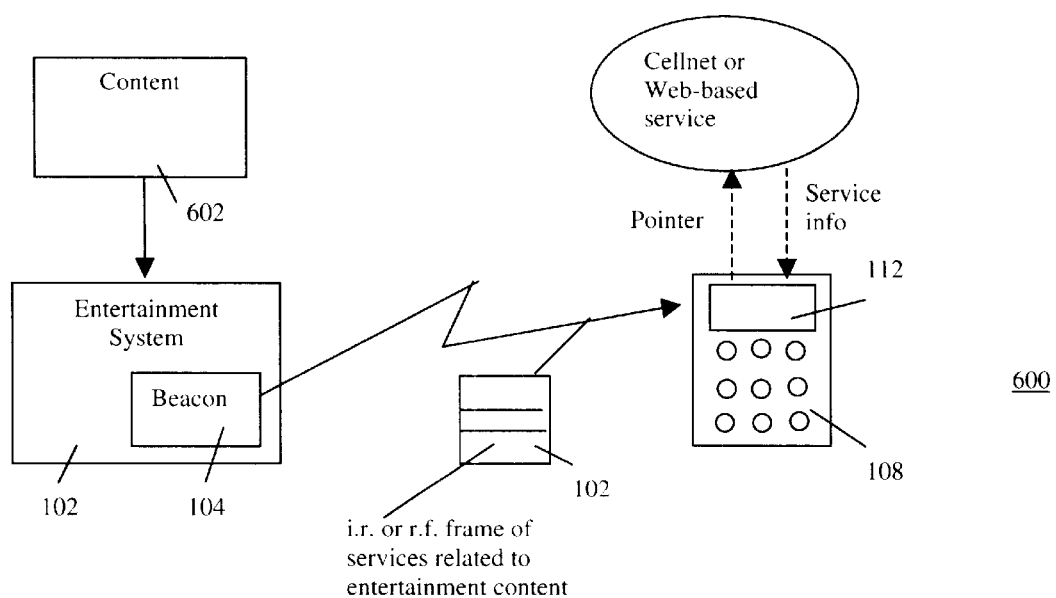
FIG. 6 is a diagram of a system in the invention in an entertainment context.

FIG. 6 is a diagram illustrating a system 600 in the invention in an entertainment context. System 600 comprises a consumer electronics (CE) system 102, such as a TV, a CD player, an MP3 jukebox, a games platform, etc. System 102 receives information content 602 for being played out or stored. Information content 602 can be supplied to system 102 on a physical carrier, such as a CD, DVD, a HDD, or a solid state memory, or via a broadcast (terrestrial, cable or satellite), or via the Internet or another data network. In this example, information content 602 is accompanied by data that enables system 102 to create a frame 604 for local transmission to mobile device 108. The data representative of the service class(-es) 506, service details 508 and pointers 512 may be stored, or supplied together with, the content itself on the physical carrier or embedded in the TV Stream, in the VBI, in an out-of-band channel, etc.). System 102 then strips this information from the content to include in the RF/IR signal 106 from its beacon 104 to mobile device 108. In this way the content itself can facilitate or re-program the pointers to its own associated services. These services, facilitated by a Bluetooth bridge can carried out over networks which are independent of those used for the primary entertainment delivery, e.g., a broadcast television channel or an MP3 download channel.

A mobile device manufacturer may provide a service-association mechanism with pre-determined associations with service providers chosen by the manufacturer. The user may accept the built-in service relationships as a convenience or in exchange for a commercial offer, such as subsidized device, free connection time, etc. The device manufacturer may choose to make an agreement with external service providers to include pre-built service look-up as a way to offset the costs in a business model, or method of doing business, subsidized by the service providers.

Each service association, e.g., look-up table entry, can be offered to the users or service providers in a way described above. For example, an on-line store for, e.g., books and music may choose to subsidize the cost of the mobile device in exchange for placing its association, e.g., URL, toll free telephone number (e.g., 1-800- . . . ), email address, etc., as a default service for these items. The mobile device may contain more than one action-type based service look-up table. For example, the user switches her mobile phone from the "buy" to the "chat" mode. This setting directs the phone to use the "chat" look-up table, instead of the "buy" one. This activity results in initiation of a chat session related to the book, or the movie.

The user can create an action-type association by editing the look-up table on the mobile device or by downloading it from another device, such as PC or a remote Internet Server. Service providers can create such profiles for their customers to facilitate the setup of the service lookup.

The facilitation signal broadcast by the beacon in a certain locale can carry different amounts of information on the locale's service directory and details of the individual services available. For example, the facilitation signal may only carry the beacon's ID. The mobile first accesses a preset URL or toll free number based on the ID in order to find the locale's service directory and their details. The mobile then checks the services against the user's profile. Any matches returned to the mobile, e.g., via WAP or SMS for possible announcement to the user along with pointers (e.g., URL's or toll-free telephone numbers) for the user to activate the services if he/she desires to do so.

In another embodiment, the facilitation signal also carries a URL to look up a locale's service directory. This is then a dynamic URL, not a preset URL.

In yet another embodiment, the facilitation signal itself carries a locale's service directory and pointers to URL's for looking up the details. A subset of the services that match a coarse user profile on the mobile device is then accessed automatically to check the services in full detail against the a full user profile. After that any matches are returned to the mobile device for announcement to the user. All preceding work is hidden from the user as before.

In yet another embodiment, the facilitation signal carries top-level description of service details and mobile is capable of storing complete profile held in a table or a condensed XML form.

In a further embodiment, the facilitation signal carries enough detailed information about the services in order to allow the matching process to be carried out with a full user profile. The process is performed at the mobile device or requires redirecting to a web site for matching against a full profile stored on the Internet. The details are adequate enough to decide whether or not to announce the service's presence to the user.

Many personal electronic devices, including mobile phones, pagers, PDAs, etc., have personal settings or profiles set up within the device, with parameters stored electronically. This could include ringer settings, address book entries and WAP browser bookmarks. Additionally, a profile set may include other personal settings such as credit card information, or could even be taken to include the SIM (Subscriber Identity Module) card used in a GSM mobile phone.

In the case of a mobile phone, a range of parameters could be stored determining how a device interacts with wireless value-added services. For example, a profile is stored that determines what kind of service the user can access, or settings to reject some kinds of call or messages when the user is at work.

Typically, the profile settings may be stored in memory on the device, or in the case of a GSM phone in memory that is part of a removable SIM card. The settings may be modifiable on the device itself—from the user interface, or preset. As an example, a SIM card could include both preset information (my own phone number) and modifiable information (a phone book of other numbers).

The user of the device may typically want to access several sets of profile information—perhaps changing settings according to the user's activity. For example, one group of settings could be selected when the user is at work (e.g., including business phone book entries, rejecting messages from friends) and another when the user is away from work (e.g., substituting friends' phone book entries, and accepting messages from friends).

The user may select profile settings from a user interface menu, download new settings from a PC, or even change the SIM card in a mobile phone. Alternatively, the user may initiate a change in preferences or profile that are triggered from the personal electronic device, but which are completely or partly stored and manipulated on a central database or server.

As personal electronic devices become more complex, and the services and applications they access become more complicated and widely available, the need for easy profile setting increases. A user may want to select from several preset, but complex, profiles.

The user may want to swap between a number of personal settings quickly and unambiguously. Users may want to swap or exchange profile settings via their SIM cards or during a set-up phase. Below it is explained how to ensure that this is both easy for the user and that the current feature or profile set is identified unambiguously.

The electronic settings could be linked to an obvious physical feature on the product. For example, this could be through a range of removable covers, jackets, antennas, batteries or other obvious physical parts that use color, texture, shape, text or graphics to quickly allow the user to associate the given physical feature with a profile or set of user preferences. As the physical feature is changed—e.g., a jacket—this in turn initiates the setting of a unique set of personal preference or a profile. This is achieved in a number of ways. In all cases the feature either triggers the selection of a set of preferences or a profile locally on the device, or identifies which is to be selected from a remotely stored set, which may be accessed over a network such as the Internet or a wireless phone network. Alternatively, the physical feature includes, for example, a removable SIM or memory card that actually stores the settings, or instructions on which set of preferences or profile to select. The memory or SIM card is connected through electrical contacts. Further, if the memory is a complete SIM card it allows several users to easily share the same mobile phone, and be certain because of the unambiguous physical feature, for which user the phone is currently set up. The SIM card may contain one or more profiles 110 and/or action tables 114 for the portal. A possible implementation is to have one SIM card per context, the cards being owned by the user. The SIM cards conventionally carrying the phone's id and frequently called numbers may stay property of the telephone company.

Alternatively, or in addition, the physical feature includes an alternate electronic component to identify it and therefore select settings within the personal electronic device when it was attached—e.g., memory, or an alternate simple electronic circuit which was connected to the device through electronic contacts, or the feature can be uniquely identified to the device to which it is attached using non-electronic connections, e.g., an optical code read by a sensor on the device or via magnetic interaction.

Note that the linking of the home environment with mobile profiles or portals can lead to new applications and functionalities. The user's profiles, action tables or portal settings used on the mobile phone may be transferred to other CE devices in the home or office, e.g., in order to pre-configure the user's preferences and preferred service providers when operating those devices. This transfer may be achieved via insertion of the SIM card in the CE device, web link or over an IR or RF link, e.g., Bluetooth download of profiles to a STB. This means that the SIM card could be used for transfer data between multiple devices. As an alternative, see U.S. Ser. No. 09/464,866 (attorney docket PHA 23,884) filed Dec. 16, 1999 for Rik Sagar for SHARED ADDRESS-DATA SERVICE FOR PERSONAL CE EQUIPMENT, herein incorporated by reference. This document relates to enabling a user to upload, to a server on the Internet, information from a first contact data base in a first communications apparatus. The server manipulates the uploaded information and extracts or converts the format of the records for a second contact data base of a second communications apparatus.

We claim:

1. A method, comprising:

receiving, at a mobile device, service offering information;

comparing at least a portion of the service offering information to at least a portion of each of a plurality of look-up table entries;

generating at least one user alert if there is at least one match found during the comparing;

retrieving communication target information from the look-up table; and initiating a communication based on the received service offering information and the communication target information;

wherein prior to comparing, the method further comprises determining, within the mobile device, whether to perform the comparing locally or remotely, and transferring the comparing to a remote computer if the determination is to perform the comparing remotely.

2. The method of claim 1, wherein the service offering information is wirelessly received at the mobile device.

3. The method of claim 2, wherein comparing is performed within the mobile device.

4. The method of claim 2, wherein comparing is performed external to the mobile device.

5. The method of claim 4, wherein the transferring operation is accomplished by the mobile device initiating a communication that propagates via at least the Internet.

6. The method of claim 2, wherein communication target information comprises a telephone number.

7. The method of claim 2, wherein communication target information comprises a URL.

* * * * *